United States Patent [19]
Lang et al.

[11] Patent Number: 5,301,910
[45] Date of Patent: Apr. 12, 1994

[54] COLLAPSIBLE SLANTED "X"-SHAPED SUPPORT STRUCTURE

[76] Inventors: Donald Lang, 880 Watertown St., W. Newton, Mass. 02165; Joseph S. Shortlidge, 132 Bay State Rd., Melrose, Mass. 02176

[21] Appl. No.: 3,150

[22] Filed: Jan. 12, 1993

[51] Int. Cl.⁵ .................................. F16M 11/38
[52] U.S. Cl. .............................. 248/166; 108/118; 248/676
[58] Field of Search ............. 248/676, 166, 165, 434; 211/203, 189, 195, 182; 108/115, 118, 119

[56] References Cited

U.S. PATENT DOCUMENTS

| | | | |
|---|---|---|---|
| 1,440,471 | 1/1923 | Kohler | 248/434 |
| 2,613,901 | 10/1952 | Tatar | 248/434 X |
| 2,939,584 | 6/1960 | Bergman | 248/164 X |
| 3,139,845 | 7/1964 | Kolinski | 108/119 |
| 4,290,532 | 9/1981 | Reynolds | 211/203 X |
| 4,321,874 | 3/1982 | Cenna | 248/164 X |
| 4,728,066 | 3/1988 | Lang | 248/165 |
| 4,763,865 | 8/1988 | Danner | 248/166 X |
| 4,974,525 | 12/1990 | Sheffield | 248/164 X |
| 5,165,635 | 11/1992 | Hoshino | 248/171 X |

FOREIGN PATENT DOCUMENTS

551524 7/1974 Switzerland ................. 211/203

*Primary Examiner*—J. Franklin Foss
*Attorney, Agent, or Firm*—Richard J. Birch

[57] ABSTRACT

A collapsible support structure having a generally "X"-shaped configuration that is slanted at an angle of between forty-five and ninety degrees to the horizontal floor plane. Two diagonal members cross one in front of the other and are joined near their center-points with a joint that allows rotation about an axis normal to the plane of the "X"-shape and is offset from the longitudinal axis of at least one of the diagonal members. The rotational axis is located closer to the upper end portion of one of the diagonal members than the upper end of the other diagonal member.

9 Claims, 9 Drawing Sheets

COLLAPSIBLE SLANTED "X"-SHAPED SUPPORT STRUCTURE

BACKGROUND OF THE INVENTION

The present invention relates to support structures in general, and more particularly to a collapsible support structure having a generally "X"-shaped planar configuration.

Musical groups travel from engagement to engagement with a variety of musical instruments and associated equipment. For example, many groups use microphones, mixers, amplifiers, equalizers, speakers and other electronic equipment during their performances. In addition to conventional musical instruments, electronically synthesized music has become an integral part of many musical performances. Electronic music synthesizers typically include one or more keyboards to provide a variety of electronically created sounds. During a performance, the synthesizer keyboards must be firmly supported at a convenient height for the musician. Since travel, set-ups and take-downs are almost mandatory part of today's musical scene, providing a suitable support surface for keyboard type electronic synthesizers presents a major problem.

It is accordingly a general object of the present invention to provide a collapsible "X"-shaped support structure.

It is a specific object of the invention to provide such a structure that is easily set up before a performance and taken down after a performance.

It is another object of the invention that the structural elements while opened provide a lightweight, yet rigid structure and support surface.

It is a feature of the invention that the support structure can be folded into a relatively small package without sacrificing the rigidity and strength of the structure when it is opened.

It is another feature of the invention that the height of the support surface or surfaces can be varied to accommodate a musician's preference without sacrificing the strength of the support structure.

It is another feature of the invention that the "X"-shape is slanted to provide a structure with better ergonomic and aesthetic attributes than found on "X"-shaped structures in existence which are not slanted.

It is another feature of the invention that while the slant of the X-shape changes as the "X"-shape is opened and closed that the structure provide a supporting surface that is parallel to the floor at all settings.

It is another feature of the invention that the center-joint allows a degree of twisting so that the bearing points at the bottom of the "X"-shaped structure will all rest on the floor even if the floor is not planar which is often the case in a musical stage environment.

BRIEF DESCRIPTION OF THE INVENTION

The collapsible support structure of the present invention utilizes two diagonal members or lever arms crossed over and connected to each other at their approximate center-points to form a generally "X"-shaped structure. An adjustable length tension member extends horizontally between the tops or bottoms of the lever arms. The height of the structure is determined by shortening or lengthening the length of the tension member so that the "X"-shape is either narrower and therefore higher, or wider and therefore shorter. Each lever arm has an angular-shaped leg located to one side of the lever arm and lying in a plane substantially normal to the plane of the "X"-shaped structure. At least one shelf bracket or other support is connected to and extends outwardly from the structure. These shelf brackets or supports form a surface for an electronic musical instrument or other apparatus. The center-joint is located at a particular point on each of the two diagonals allowing the "X"-shape to stand at an angle other than ninety-degrees to the floor and to define a supporting surface that is parallel to the floor plane while the "X"-shape is opened and closed to different settings. The center-joint also allows a degree of twisting of the diagonal members about the axis running through their length so that all of the bearing points at the bottom of the structure will all rest on the floor even if the floor is not planar.

DESCRIPTION OF THE DRAWINGS

The objects and features of the invention set forth above and other objects and features can best be understood from a detailed description of a preferred embodiment of the invention selected for purposes of illustration and shown in the accompanying drawings in which:

FIG. 9 is a second detail view of the joint between the two lever arms with the position of the lever arms relative to each other being such as they would be if the height of the stand were set at a low setting (as in FIG. 7). The drawing is marked and labeled exactly as in FIG. 8. In conjunction FIGS. 8 and 9 illustrate the changing location of the "virtual axis" along the length of the diagonals at different height settings of the "X"-shaped structure; and, FIG. 10 is a view in partial section showing the center-joint.

DETAILED DESCRIPTION OF THE INVENTION

Figure 1:
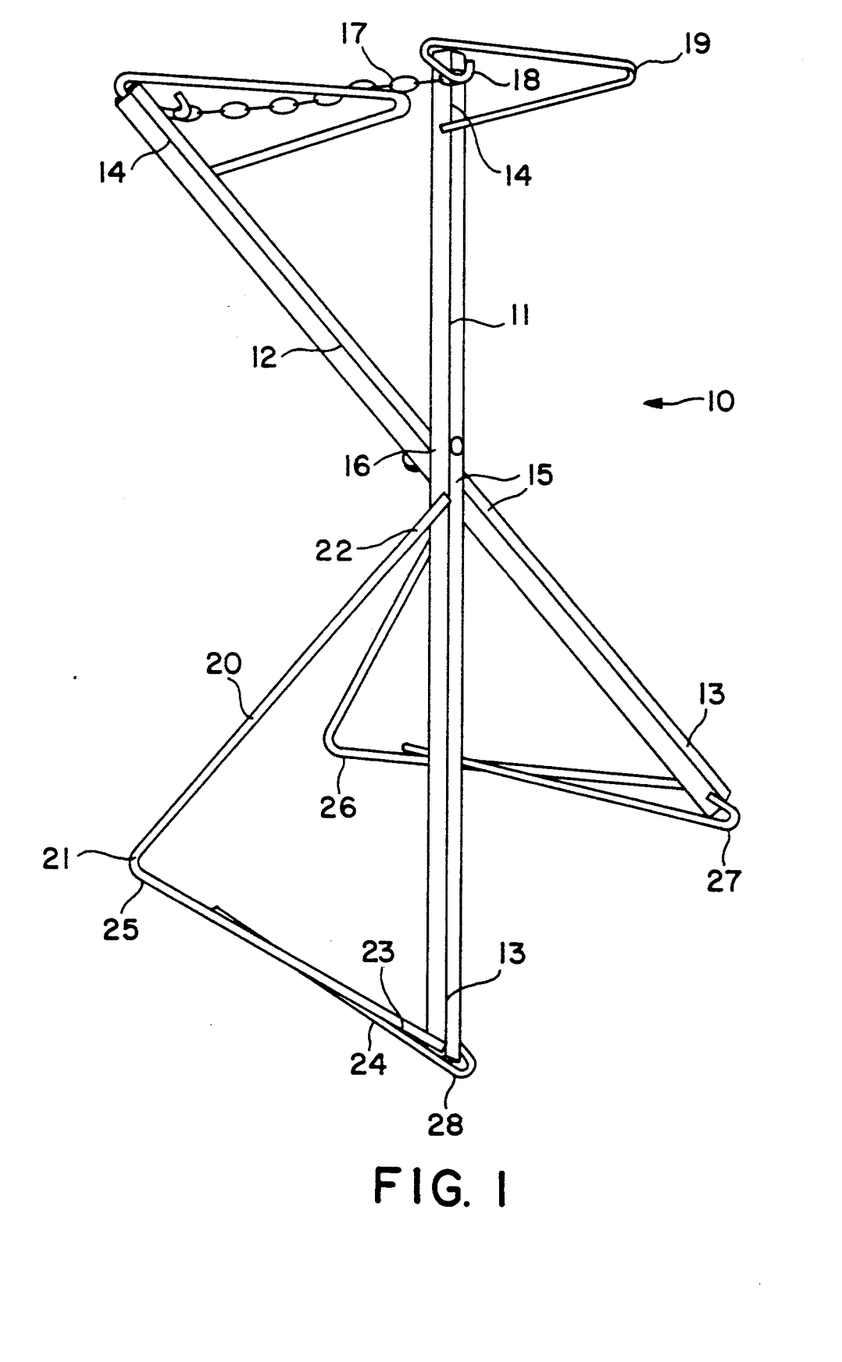
FIG. 1 is a perspective view of the support structure.

Turning now to the drawings, and particularly to FIG. 1 thereof, there is shown a collapsible slanted "X"-shaped support structure constructed in accordance with the present invention and indicated generally by the reference numeral 10.

The slanted "X"-shaped support structure 10 includes two lever arms or diagonal members indicated generally as 11 and 12, each of which has a base end portion 13, and upper end portion 14 and an intermediate portion 15. The diagonal members 11 and 12 are of equal length and cross one in front of the other at their intermediate portions 15. In the preferred embodiment, each diagonal 11 and 12 is formed from a single piece of tubing including the base 13, intermediate 15 and upper portions 14 of the diagonal 11 or 12. As shown in FIG. 1 the first diagonal 11 running from lower left to upper right crosses in front of the second diagonal 12. The diagonals 11 and 12 are joined near their intermediate portion 15 with a permanent joint 16 that allows rotation of the diagonals about an axis normal to the plane of the "X"-shape.

It will be appreciated at this point in the description of the invention that the diagonals 11 and 12 form a generally "X"-shaped structure. As shown in FIG. 1, the plane of this generally "X"-shaped structure has been depicted as though it were at sixty-degrees to the plane of the drawing and is slanted backwards from vertical between zero and forty-five-degrees.

Figure 2:
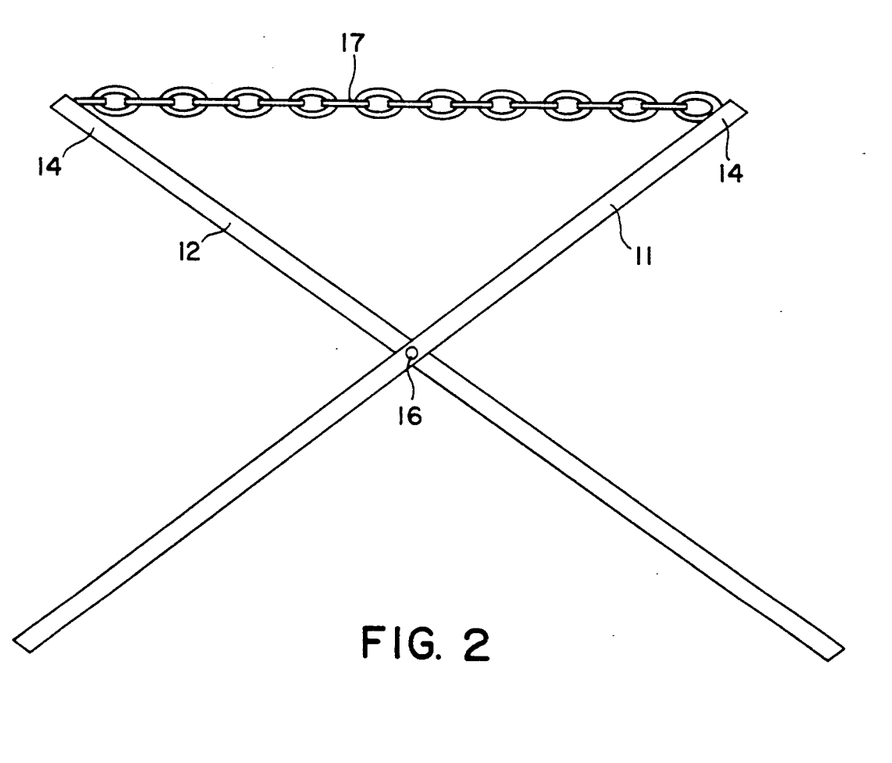
FIG. 2 is a front elevation view of the support structure with the angular legs and shelf brackets removed for purposes of clarity and illustrating the adjustable length tension member used at a long length setting the structure at a relatively low height.
Figure 3:
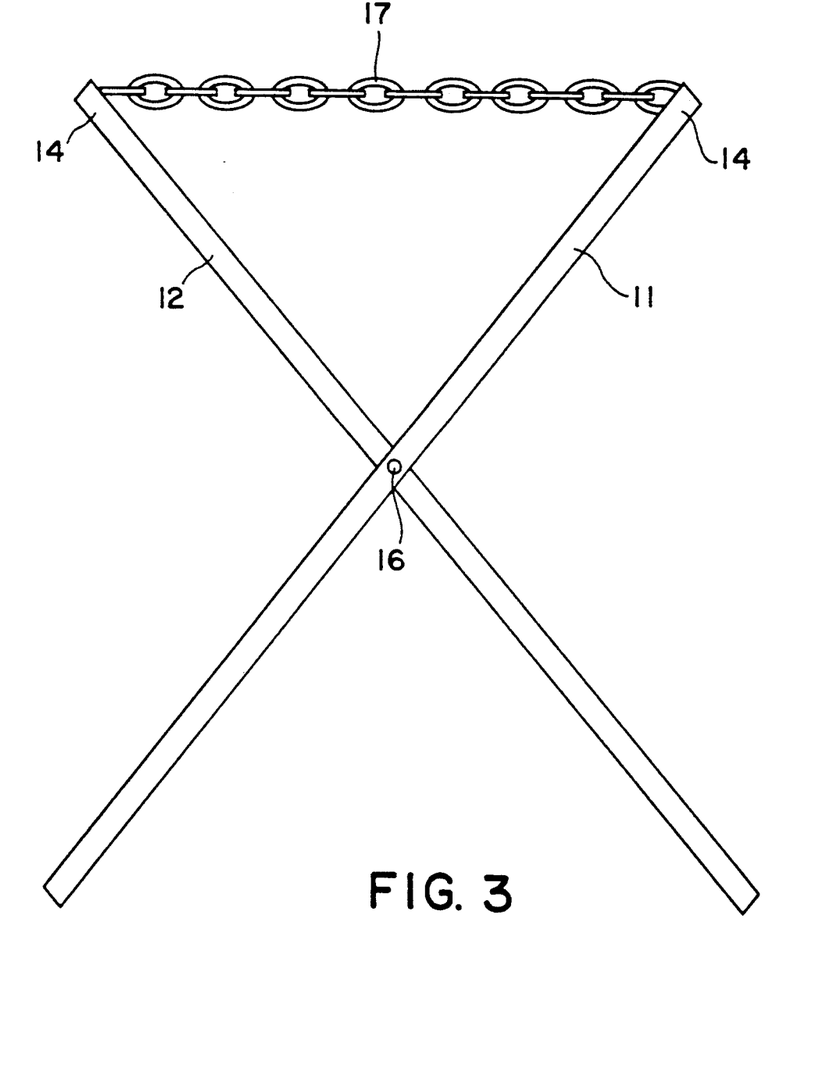
FIG. 3 is a second front elevation view similar to FIG. 2 and showing the use of the adjustable length horizontal member set at a shorter length than in FIG. 2 thereby setting the structure at a higher height.
Figure 4:
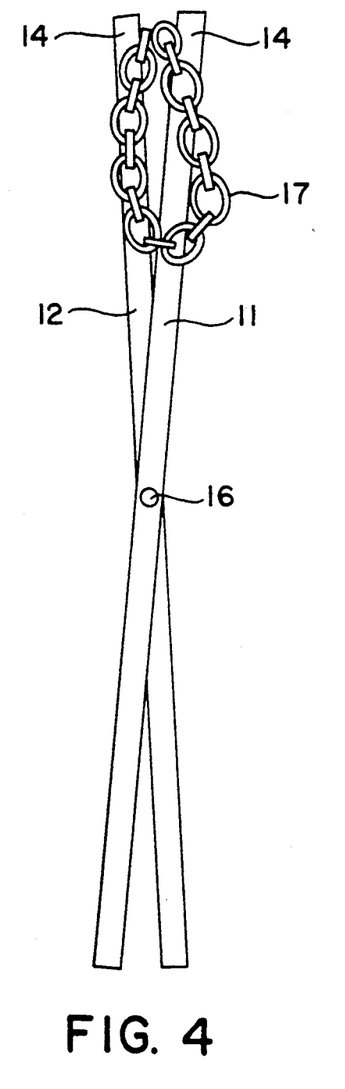
FIG. 4 is a third front elevation view showing the structure at its highest and completely collapsed position in which the two diagonals lie next to each other.

The "X"-shaped structure in its fully collapsed position is shown in FIG. 4. To open the structure to an "X"-shape the lower portions 13 or upper portions 14 of the diagonals 11 and 12 are pressed apart and thereby rotated in opposite directions around the center-joint 16. FIG. 3 shows the "X"-shape opened a small amount and FIG. 2 shows it opened a large amount.

An adjustable length tension member 17 is connected between either the lower portions 13 or the upper portions 14 of both diagonal members 11 and 12. When the diagonal members 11 & 12 are opened to an "X"-shape then the adjustable tension member 17 is put under tension preventing the diagonal members 11 & 12 from opening beyond a given angle.

Figure 5:
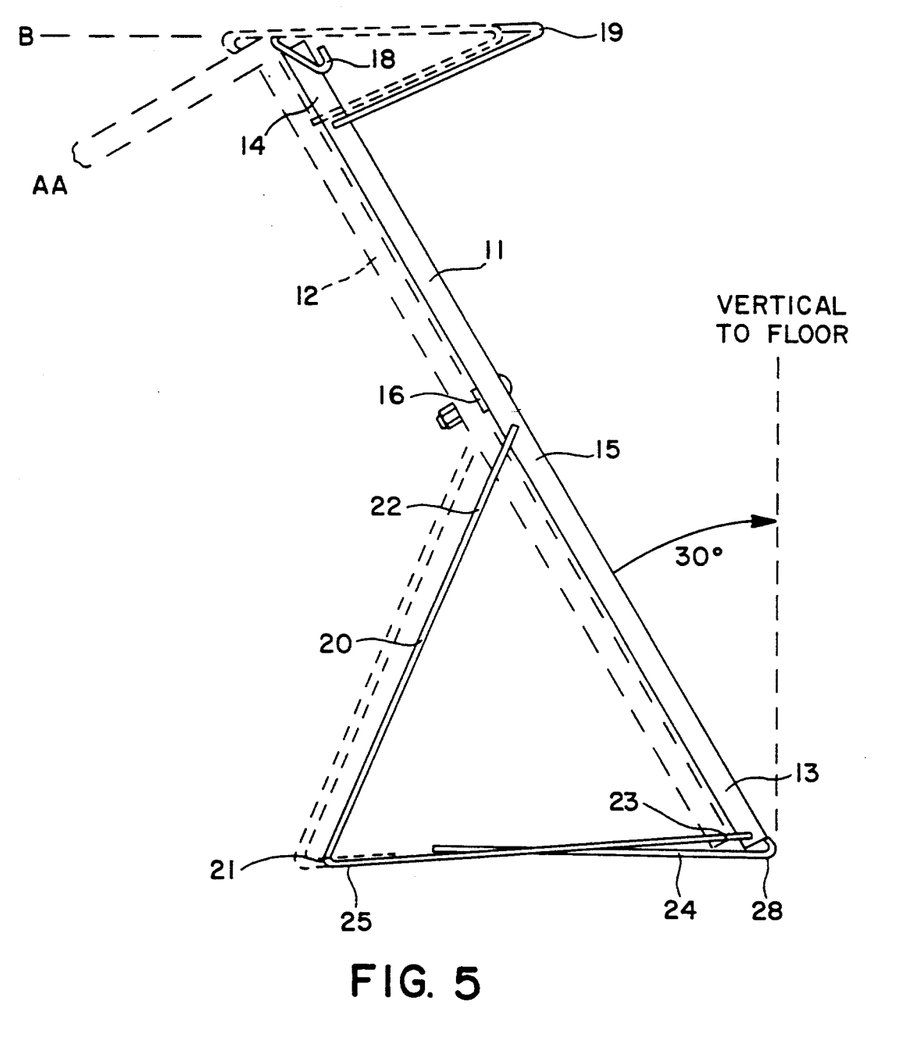
FIG. 5 is a view in side elevation showing the structure at its highest and completely collapsed position (the same position as in FIG. 4 but from a side view), with one lever arm complete with leg and shelf bracket shown in solid lines and the other lever arm complete with leg and shelf bracket shown in dotted lines for purposes of clarity. The tension member is not shown. The figure is used to illustrate the position of the center-joint along the length of each of the two diagonals in a slanting "X"-shaped structure in which one diagonal is in front of the other. Also shown is the angle of slant of the structure away from vertical.

In the preferred embodiment the tension member 17 is a length of flexible chain that has open chain-links which are placed over the ends of the tensioner hooks 18 as shown in FIG. 1. The hooks 18 are part of the shelf bracket wires 19. Given the arrangement shown in FIG. 4, if the upper tension member 17 is formed of a flexible material, it does not have to be removed from the structure as the structure is collapsed by rotating the upper portions 14 of the two diagonals 11 and 12 toward each other about their center joint 16 so that the diagonals 11 and 12 lie next to each other as shown in FIG. 5. It can be understood that the same structure can be used with a rigid tension member 17 if it can be removed from one or both of the diagonal members 11 and 12.

It will be appreciated that as the diagonals 11 and 12 are opened to an "X"-shape the adjustable tension member 17 will become taught and prevent the top of the diagonals 14 from opening further. The amount that the "X"-shape can be opened is determined by the length of the adjustable length tension member 17. At the point where the tension member 17 is taught and the stand is set upright on the floor the collapsible slanted "X"-shaped support structure 10 provides a rigid structure for electronic components or other apparatus that may be placed on supports connected to and extending outwardly from the structure. In the preferred embodiment angular shelf brackets 19 are connected to and extend outwardly from the upper portion of the diagonals 11 and 12 as seen in FIG. 1.

Each diagonal member has an angular leg brace 20 with a vertex 21 and a top end 22 and a bottom end 23. The top end 22 is connected to the intermediate portion 15 of the corresponding diagonal 11 and 12, and the bottom end 23 is connected to the base end portion 13 of the corresponding diagonal 11 and 12. In addition, for maximum stability, a strut 24 is also connected from the base end portion 13 of each diagonal 11 and 12 to the vertex 21 of the leg brace 20 attached to the same diagonal. In the preferred embodiment the end of the strut 24 that is connected to the base end portion 13 of the diagonal 11 and 12 also provides a bearing point on which the base end 13 of the diagonal 11 and 12 stands when the structure is set up on the floor. Each angular leg brace 20 lies in a plane substantially normal to the plane of the "X"-shaped structure. Together the two leg braces 20 set the angle at which the plane of the "X"-shaped structure 10 meets the floor plane. The angle is not a right angle and varies with the amount the diagonals 11 and 12 are rotated about their center-joint 16 relative to each other.

As the angle at which the plane of the "X"-shaped structure 10 meets the floor plane is not a right angle and as the diagonal members 11 and 12 cross one in front of the other, it can be seen that the first one of the diagonals 11 is on top and the second one 12 is on the bottom of the pair.

Figure 6:
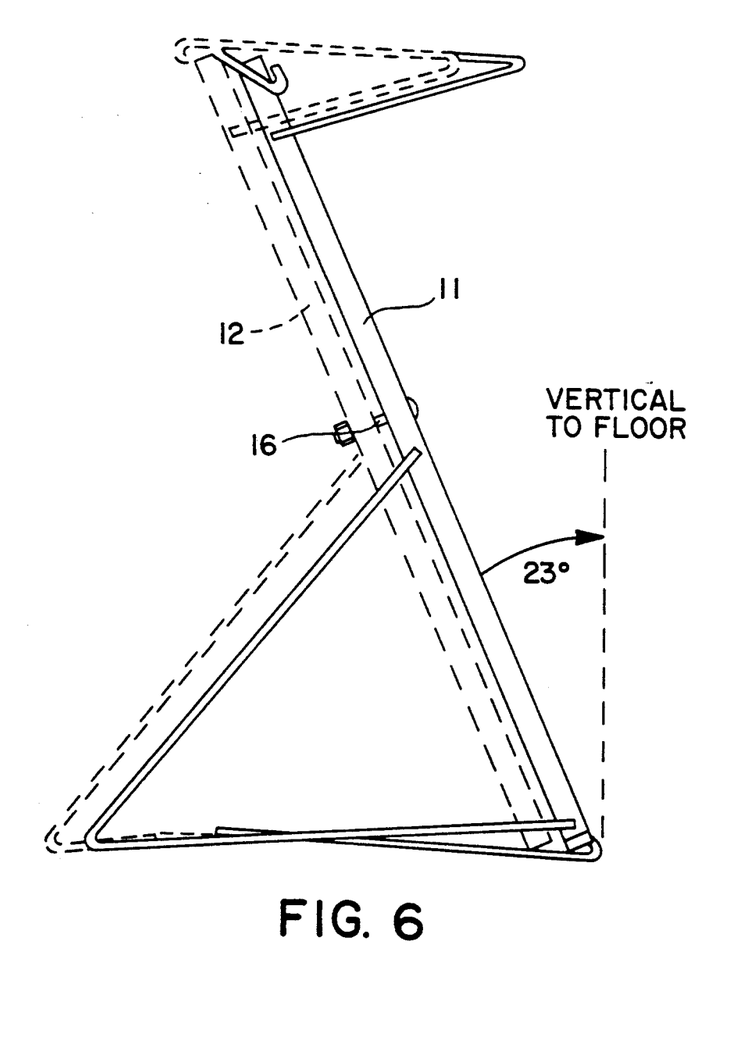
FIG. 6 is a second view in side elevation of the support structure similar to FIG. 5 and showing that the angle of slant of the "X"-shape is at a different angle to the floor at different heights. The "X"-shaped structure is at a high height setting which is between the highest height shown in FIG. 5 and the low height shown in FIG. 7.
Figure 7:
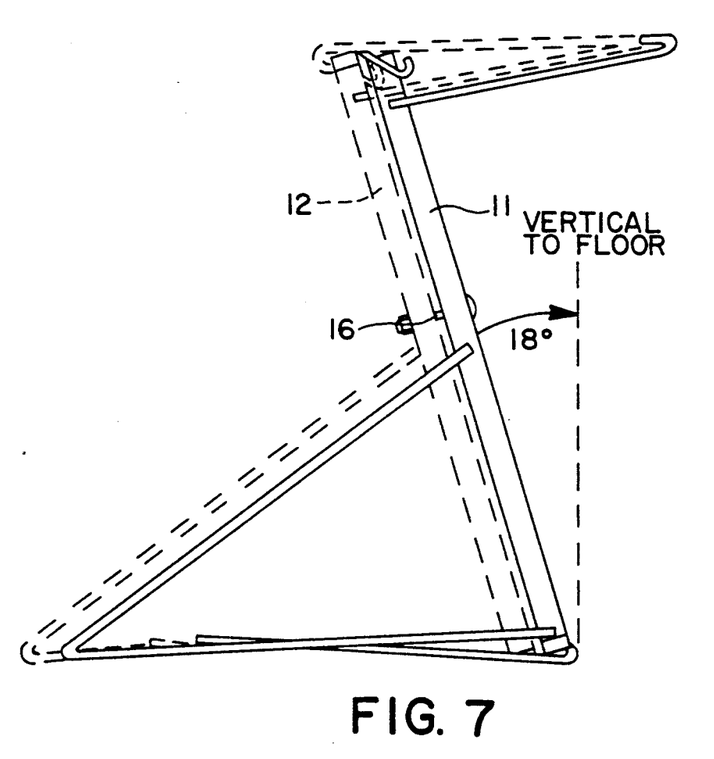
FIG. 7 is a third view in side elevation similar to FIG. 5 and showing the "X"-shaped structure at a lower height setting relative to the floor than in FIG. 6 and illustrating that the angle of slant of the "X"-shape is at a different angle to the floor at different heights.

Since the angle at which the plane of the "X"-shaped structure 10 meets the floor plane is not a right angle, the center-joint 16 of the diagonals 11 and 12 is located at different positions along the length of both diagonals 11 and 12, and particularly that it is located higher on the top diagonal 11 and lower on the bottom diagonal 12. In FIG. 5 "B" locates the top ends 14 of both diagonals 11 and 12 as measured from the floor plane vertically, showing that both ends are at the same height to provide a level supporting surface upon which electronic instruments are placed at the top of the structure 10. Also in FIG. 5 the two dotted lines marked "AA" locate the top ends 14 of the diagonals 11 and 12 at different positions as measured from the center-joint 16 along the length of the diagonals 11 and 12. This shows that while the top ends 14 of the diagonals 11 and 12 are at the same height from the floor to provide for a level supporting surface, the center-joint 16 is located at different positions from the two top ends 14 of the diagonals 11 and 12. FIGS. 6 and 7 show that this same positional relationship of the center-joint 16 and two diagonals 11 and 12 is provided at different height settings of the structure 10.

In order to maintain a level playing surface the relative locations of the center-joint 16 along the diagonals 11 and 12 is determined by the amount of angle at which the plane of the "X"-shape is slanted. If the "X"-shape is at ninety-degrees to the floor then the locations of the center-joint 16 along the lengths of the two diagonals 11 and 12 are identical. As the "X"-shape is slanted away from ninety-degrees the relative locations of the center-joint 16 on the two diagonals 11 and 12 also must shift.

FIGS. 5, 6 and 7 show the preferred embodiment of the invention and show that the angle at which the plane of the slanted "X"-shaped structure 10 slants away from the vertical to the floor plane varies with the amount that the "X"-shape 10 is opened. FIG. 5 shows the relative angle of thirty degrees between the "X"-shape 10 and the vertical when the "X"-shape 10 is in its tallest and fully collapsed configuration. FIG. 6 shows the relative angle of twenty-three degrees when the "X"-shape 10 is opened a small amount. FIG. 7 shows the relative angle of eighteen degrees when the "X"-shape is opened a large amount. In the preferred embodiment the angle from the vertical changes from approximately thirty to approximately eighteen degrees as the "X"-shape is opened. As the angle of slant changes then the location of the center-joint 16 along the length of each of the two diagonals 11 and 12 needs to be adjusted. An automatic adjustment that requires no added manipulations by the user is desirable.

Figure 8:
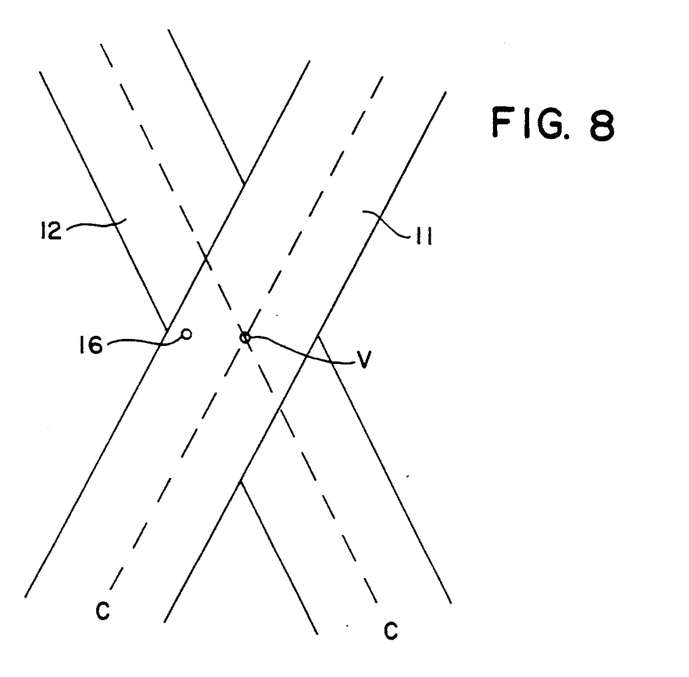
FIG. 8 is a detail view of the center-joint between the two lever arms with the position of the lever arms relative to each other being such as they would be if the height of the stand were set at a high setting (as in FIG. 6). Dotted lines show the locations of the center-lines of the lever arms. Also shown are the off-center locations of the center-joint on the diagonals and the position of the "virtual axis" (where the center-lines of the lever arms cross) at the particular high height setting. The amount that the center-joint has been located off-center in FIGS. 8 & 9 has been exaggerated to show relative locations more clearly.
Figure 9:
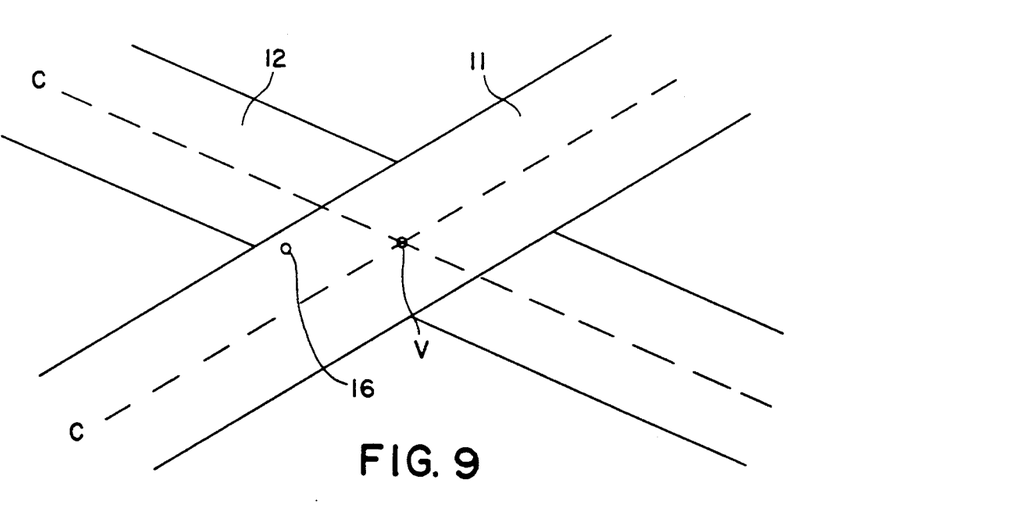

In the preferred embodiment as shown in FIGS. 8 and 9 this is achieved by positioning the center-joint 16 to one side of the center-lines "C" on both diagonals 11 and 12 so that when the diagonals 11 and 12 rotate relative to each other then the point at which their center-lines "C" cross "V", referred to hereafter as the virtual-axis, also changes. As the stand 10 is opened and closed to different height settings with this center-joint 16 configuration then the virtual-axis "V" shifts from where the it is farther away from the actual center-joint 16 as measured along the lengths of the diagonals 11 and 12 in the lower height setting of the structure as shown in FIG. 9 to where the virtual-axis "V" is closer to the center-joint 16 at the higher height setting as shown in FIG. 8.

In FIGS. 8 and 9 the offset of the center-joint 16 from the center-line of the diagonals 11 and 12 has been exaggerated to show this shift more clearly. In the preferred embodiment, with both diagonals having equal lengths of 42¼", the offset of the center-joint 16 from the center lines "C" of the diagonals 11 and 12 is 1/16" to the left of both center-lines "C". This location effects the best shift in location of the virtual-axis "V" in the preferred embodiment as the "X"-shape 10 is opened or closed within the most commonly used range of height settings.

Figure 10:
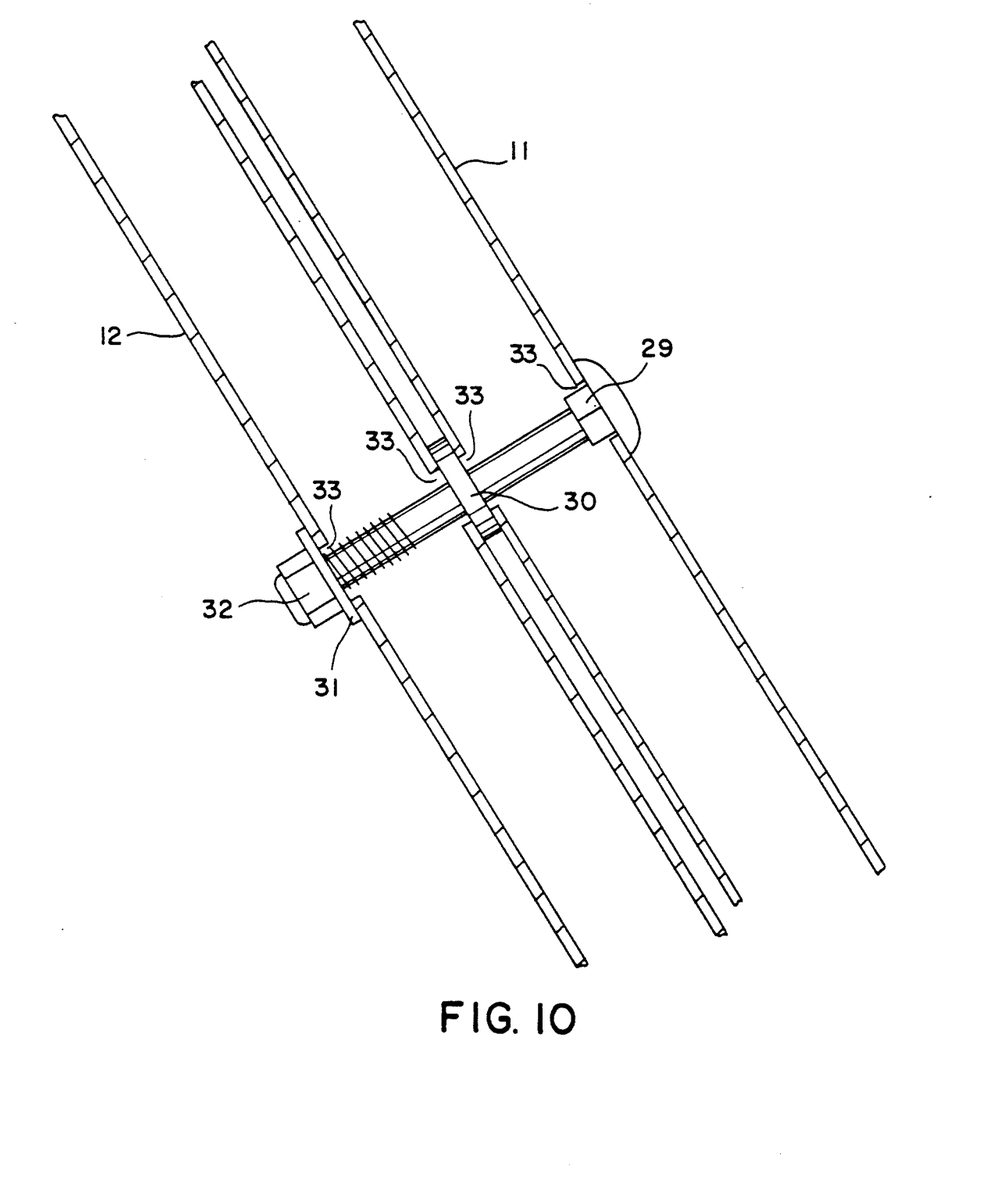

As shown in FIG. 10, in the preferred embodiment the center-joint 16 is constructed with loose fitting parts (a carriage-bolt 29, a soft plastic washer 30, a metal washer 31, a nut 32 and four perforations 33 in the walls of the tubing used in the diagonals 11&12) which allow a degree of rotation of each diagonal member 11 & 12 about the axis running through its length. This is so that the bearing points 25, 26, 27 and 28 at the bottom of the "X"-shaped structure 10 will all rest on the floor even if the floor is not planar. The diagonal 11 & 12 can rotate around the axis along its length moving the attached leg brace 20 up and down with relation to the floor plane. As shown in FIG. 10 a soft plastic washer 30 fills the center-joint 16 between the two diagonal members 11 & 12 keeping them from rubbing and rattling against each other, while still allowing twisting of the center-joint 16 on uneven floors.

Having described in detail a preferred embodiment of our invention it will now be obvious to those skilled in the art that numerous modifications can be made therein without departing from the scope of the invention as defined in the claims. For instance the tension member can be attached anywhere above or below the center-joint and still be effective in its primary function to prevent the top of the diagonals 14 from opening further at a given height setting.

Also shelf brackets and other supports may be attached anywhere on the structure depending on the items and positions of the items to be supported.

Other possible modifications include that the tension member 17 can be fixed permanently to one of the diagonal 11 and 12, or that the tension member 17 can also be formed of a woven fabric strap with grommets, or that the tension member 17 can also be formed of a ball-chain with a slotted or key-hole connections. Given these configurations, it can be seen that the length of the tension member 17 between the two diagonals 11 and 12 can be varied as is necessary.

What we claim and desire to secure by Letters Patent of the United States is:

1. A collapsible "X"-shaped support structure comprising:

A. a first longitudinally extending diagonal member having a longitudinal axis, a base portion, an upper end portion and an intermediate portion therebetween;

B. a second longitudinally extending diagonal member having a longitudinal axis, a base portion, an upper end portion and an intermediate portion therebetween, said second longitudinally extending diagonal member crossing in back of the first longitudinally extending member to form therewith a generally "X"-shaped structure;

C. means for rotationally connecting together the intermediate portions of said first and second longitudinally extending diagonal members, said connecting means allowing rotation of said first and second longitudinally extending diagonal members about a common axis that is normal to the plane of the generally "X"-shaped structure and is offset from the longitudinal axis of at least one of said first and second longitudinally extending diagonal members, said rotational axis being located closer to the upper end portion of said first longitudinally extending member than to the upper end portion of said second longitudinally extending diagonal member;

D. first and second base support means secured respectively to the base portions of said first and second longitudinally extending diagonal members to form an angle of less than 90 degrees therewith whereby the plane of said generally "X"-shaped structure intersects a ground plane at an angle of less than 90 degrees; and, E. means for establishing a selected, angular rotational separation between said first and second longitudinally extending diagonal members.

2. The collapsible "X"-shaped structure of claim 1 wherein the common rotational axis is offset from the longitudinal axes of both of said first and second longitudinally extending diagonal members.

3. The collapsible "X"-shaped structure of claim 1 wherein said first and second longitudinally extending diagonal members have the same longitudinal length.

4. The collapsible "X"-shaped structure of claim 1 wherein said first and second base support means each comprise a longitudinally extending base element and a longitudinally extending slanted element with one end of each element connected together and with the other end of the longitudinally extending base element connected to the base portion of the longitudinally extending diagonal member and with the other end of the longitudinally extending slanted element connected to the intermediate portion of the longitudinally extending diagonal member to form a triangular structure the plane of which is normal to the plane of the generally "X"-shaped structure formed by said first and second longitudinally extending diagonal members.

5. The collapsible "X"-shaped structure of claim 1 further comprising first and second support means secured respectively to the upper end portions of the first and second longitudinally extending diagonal members, said first and second support means maintaining a common, but variable distance with respect to the corresponding first and second base support means as the first and second longitudinally extending diagonal members are rotated about their common rotational axis.

6. The collapsible "X"-shaped structure of claim 1 wherein said means for rotationally connecting together the intermediate portions of said first and second longitudinally extending diagonal members includes means for permitting twisting of said first and second longitudinally extending diagonal members about the longitudinal axes thereof.

7. The collapsible "X"-shaped structure of claim 1 wherein said means for establishing a selected, angular rotational separation between first and second longitudinally extending diagonal members comprises an adjustable length tensioning member.

8. The collapsible "X"-shaped structure of claim 7 wherein said adjustable length tensioning member extends between the upper end portions of said first and second longitudinally extending diagonal.

9. The collapsible "X"-shaped structure of claim 7 wherein said adjustable length tensioning member extends between the base portions of said first and second longitudinally extending diagonal members.

* * * * *